(12) United States Patent
Li et al.

(10) Patent No.: US 11,029,393 B2
(45) Date of Patent: Jun. 8, 2021

(54) DUAL-AXIS RESONATE LIGHT BEAM STEERING MIRROR SYSTEM AND METHOD FOR USE IN LIDAR

(71) Applicant: Turboroto, Inc., Santa Clara, CA (US)

(72) Inventors: Ping Li, Santa Clara, CA (US); Charles Liang Li, Santa Clara, CA (US)

(73) Assignee: Turro LLC, Santa Clara, CA (US)

(*) Notice: Subject to any disclaimer, the term of this patent is extended or adjusted under 35 U.S.C. 154(b) by 494 days.

(21) Appl. No.: 16/103,608

(22) Filed: Aug. 14, 2018

(65) Prior Publication Data
US 2019/0137610 A1 May 9, 2019

Related U.S. Application Data

(60) Provisional application No. 62/548,693, filed on Aug. 22, 2017, provisional application No. 62/577,092, (Continued)

(51) Int. Cl.
*G01S 7/48* (2006.01)
*G01S 7/481* (2006.01)
(Continued)

(52) U.S. Cl.
CPC .......... *G01S 7/4817* (2013.01); *G01S 7/4815* (2013.01); *G01S 17/10* (2013.01); *G01S 17/42* (2013.01); *G01S 17/87* (2013.01); *G01S 17/931* (2020.01)

(58) Field of Classification Search
CPC ........ G01S 7/4815; G01S 17/42; G01S 17/10; G01S 17/89; G01S 7/4812; G01S 17/08; G01S 17/931; G01S 7/4817; G01S 7/4814
See application file for complete search history.

(56) References Cited

U.S. PATENT DOCUMENTS 7,969,558 B2  6/2011  Hall
9,086,273 B1  7/2015  Gruver
(Continued)

FOREIGN PATENT DOCUMENTS

WO    WO2017045816 A1    9/2015

OTHER PUBLICATIONS

International Preliminary Report on Patentability, PCT/US2018/046787, dated Mar. 5, 2020.
(Continued)

*Primary Examiner* — Luke D Ratcliffe
(74) *Attorney, Agent, or Firm* — Roark IP

(57) ABSTRACT

A Light Imaging, Detection and Ranging (LIDAR) system with multiple LIDAR units share a dual axis resonate motor (or tip-tilt) beam steering mirror (BSM). The dual axis resonate motor (or tip-tilt) beam steering mirror has two degrees of rotational freedom, first rotor rotate reference to second rotor through connected first torsion spring axis, the second rotor is also the stator of the first rotor, second rotor rotate reference to stator through connected second torsion spring axis. Alternating electric current energizes electric coils to create electromagnetic force which resonates the rotors coaxially along the torsion spring axis. Each of the polarity of the LIDAR units shares the BSM and covers a fractional field of view of the system. The dual axis resonate motor (or tip-tilt) beam steering system is capable of scanning each individual LIDAR unit point measurement data into a 3D (distance, vertical angle, horizontal angle) data cloud.

22 Claims, 14 Drawing Sheets

Related U.S. Application Data filed on Oct. 25, 2017, provisional application No. 62/621,584, filed on Jan. 24, 2018.

(51) Int. Cl.
  *G01S 17/10* (2020.01)
  *G01S 17/42* (2006.01)
  *G01S 17/87* (2020.01)
  *G01S 17/931* (2020.01)

(56) References Cited

U.S. PATENT DOCUMENTS

| | | |
|---|---|---|
| 9,575,164 B2 | 2/2017 | Kim |
| 9,880,263 B2 | 1/2018 | Droz |
| 2007/0181810 A1 | 8/2007 | Tan et al. |
| 2009/0015891 A1* | 1/2009 | Kane ............... G01J 3/0289 359/198.1 |
| 2014/0159827 A1 | 7/2014 | Hofmann |
| 2015/0260847 A1 | 9/2015 | Sromin |
| 2016/0274589 A1 | 9/2016 | Templeton |
| 2016/0327646 A1 | 11/2016 | Scheim |
| 2018/0292532 A1* | 10/2018 | Meyers ............ G01S 7/4815 |

OTHER PUBLICATIONS

Ye, Liangchen, "Large-Aperture kHz Operating Frequency Ti-alloy Based Optical Micro Scanning Mirror for LiDAR Application", Micromachines, Apr. 10, 2017.

International Search Report and Written Opinion for PCT/US2018/046787 dated Apr. 29, 2019.

\* cited by examiner

DUAL-AXIS RESONATE LIGHT BEAM STEERING MIRROR SYSTEM AND METHOD FOR USE IN LIDAR

CROSS-REFERENCE TO RELATED APPLICATIONS

This application claims the benefit of U.S. Provisional Patent Application Ser. No. 62/548,693, filed Aug. 22, 2017; U.S. Provisional Patent Application Ser. No. 62/577,092, filed Oct. 25, 2017; and U.S. Provisional Patent Application Ser. No. 62/621,584, filed Jan. 24, 2018. All of these references are incorporated herein by reference in their entireties.

FIELD OF THE DISCLOSURE

The present disclosure relates a Light Imaging, Detection and Ranging (LIDAR) system having multiple LIDAR units utilizing a beam steering mirror (BSM) which may be used in a variety of applications such as autonomous (or semi-autonomous) driver technologies.

BACKGROUND OF THE DISCLOSURE

Autonomous vehicles use various computing systems to aid in transporting passengers from one location to another. Some autonomous vehicles may require an initial input or continuous input from an operator such as a pilot, driver, or passenger. Other systems, for example autopilot systems, may be used only when the system has been engaged, which permits the operator to switch from a manual mode (where the operator exercises a high degree of control over the movement of the vehicle) to an autonomous mode (where the vehicle essentially drives itself) to modes that lie somewhere in between. These system frequently use a wide variety of sensors and detectors such as LIDAR systems to allow for autonomous driving.

SUMMARY OF THE INVENTION

Further aspects of the current disclosure include: a Light Imaging, Detection and Ranging (LIDAR) system comprising: at least 6 LIDAR units shares one beam steering mirror assembly; a flexure beam steering mirror (BSM) assembly reflecting transmitted light from the at least 6 LIDARS units on a beam steering mirror having dimensions in a first axis of approximately 10 to 30 mm and a second axis approximately 10 to 30 mm; and wherein the beam stirring mirror is configured to resonate from an electromagnetic force on the first axis and the second axis to achieve a range of approximately negative 20 degrees to plus 20 degrees optical field of view on both the first axis and the second axis to determine the shape of a distant object.

Further aspects of the current disclosure include a method of LIDAR scanning to determine the configuration of a distant object utilizing dual axis resonate flexure motor beam steering mirror comprising: at least six of LIDAR units share transmitting light onto the flexure beam steering mirror in a first position of a plurality of positions, wherein each of the LIDAR units are placed at different incidence angles in reference to the BSM assembly and each of the LIDAR units cover a fractional field of view of said LIDAR system field of view; moving the mirror from the first position of the plurality of positions to a second position of the plurality of positions; wherein the plurality of positions can be in a range of approximately −20 to +20 degrees on a first axis to a range of approximately −20 to +20 degrees on a second axis; and wherein the mirror can be in a range of approximately 10 to 30 mm on a first axis to a range of approximately 10 to 30 mm on a second axis.

Aspects of the current disclosure may further include: a Light Imaging, Detection and Ranging (LIDAR) system comprising: a plurality of LIDAR units (e.g., six units); and a beam steering mirror (BSM) assembly having a beam steering mirror configured to resonate on a first axis and a second axis to determine the configuration of a distant object. Each of the plurality of LIDAR units may be placed at different incidence angles in reference to the BSM assembly and each of said plurality of LIDAR units cover a fractional field of view of said LIDAR system field of view. The BSM assembly may comprise: a beam steering mirror mounted on a first rotor with approximately ten degrees of mechanical rotational freedom; a first pair of torsion springs forming a first axis upon which the first rotor rotates together with the beam steering mirror; a second pair of torsion springs forming a second axis with approximately ten degrees of mechanical rotational freedom, upon which the first rotor, second rotor and the beam steering mirror rotate; a stator providing a stationary platform for the first and second rotors; and a first electric coil and a second electric coil providing a force to cause the BSM assembly to rotate. The first rotor may be connected with the second rotor through the first torsion springs and able to resonate coaxially about the first torsion spring while induced by at least one energized first electric coil. The second rotor may be connected with the stator through the second pair of torsion springs and is able to resonate coaxially about said second torsion spring while induced by at least one energized second electric coil. The first rotor may rotate in reference to the second rotor, while the second rotor is stationary with respect to the first rotor, the second rotor rotates in reference to the stator so that the beam steering mirror and first rotor rotate on two axes. The first rotor may further comprise at least one torsion spring, at least one insert, at least one spacer, and at least one flux layer wherein the at least one insert, at least spacer, and at least flux layer can be one integral part and placed symmetrically upon both sides of the first torsion spring; and wherein said second rotor comprises at least one torsion spring one insert, at least one spacer, at least one flux layer wherein said insert, spacer, flux layer can be one integral parts and is symmetrically placed on both sides of the second torsion spring. The stator may comprise at least one insert, at least one spacer, and at least one flux layer and wherein aid insert, spacer, flux layer can be one integral part and is symmetrically placed on both sides of the second torsion spring. The insert, spacer, and flux layers may be magnetically permeable silicon steel laminated, resistance welded, riveted and epoxy glued. The BSM assembly may further comprise at least one first electric coil mounted on the first rotor in a moving coil configuration magnetically coupled with the second rotor and wherein said magnets are magnetically permeable material in reluctance motor configuration. The BSM assembly may further comprise at least one first electric coil is mounted on the second rotor in moving magnets configuration magnetically coupled with first rotor and wherein said magnets are magnetically permeable material in reluctance motor configuration. In one embodiment of the BSM assembly the first rotor resonates with reference to the second rotor while the first electric coil is energized by an alternating electric current. In another embodiment of the BSM assembly the at least one second electric coil is mounted on the second rotor in a moving coil configuration magnetically coupled with the stator and wherein the first and second magnets are magnetically permeable material in reluctance motor configuration. In another embodiment of the BSM assembly the at least one second electric coil is mounted on the stator in moving magnets configuration magnetically coupled with the second rotor. In another embodiment of the BSM assembly the second rotor resonates with reference to the stator while the second electric coil is energized by an alternating electric current. In another embodiment of the BSM assembly the first pair of torsion springs and second pair of torsion springs can be separate mechanical parts or an integrated one single mechanical piece made of metal from the group consisting of: titanium, titanium alloy, stainless steel, Inconel, steel and steel alloy. The BSM assembly disclosed herein may be used in at least one of the group consisting of: an automobile LIDAR system, a vehicle autonomous drive, a robot, a factory automation LIDAR, a projector, and a heads up display.

DETAILED DESCRIPTION

An autonomous vehicle operating on a road may rely on identifying objects in a vicinity of the vehicle to determine a safe trajectory or path for the vehicle on the road. In some examples, following a geometric center of a lane may not be sufficient for safety; instead, the vehicle may be configured to determine a lateral position in a lane based on a plurality of factors. For example, the vehicle may take into consideration curvature of the road, proximity of static and dynamic obstacles, relative positions and speeds of obstacles, etc. An autonomous vehicle computing device, configured to control a vehicle following a given trajectory on a road, may be configured to identify a set of objects that may have an effect on a lateral positioning of the vehicle within the lane. The set of objects may include, for example, cars in adjacent lanes both behind and ahead of the vehicle, static objects (e.g., guard rails, curbs, trees, etc.), and motorcycles and cyclists ahead and behind the vehicle. Upon identifying the objects, the autonomous vehicle computing device may be configured to estimate characteristics of each object such as size and shape of each object, position of each object in a respective lane, and longitudinal and lateral speeds of each object relative to the vehicle.

FIGS. 1A-1D illustrate an exemplary vehicle 100 having an autonomous vehicle control system. Although vehicle 100 is illustrated in FIGS. 1A-1D as an automobile other types of uses are possible. An autonomous vehicle control system may be implemented in other vehicles such as cars, vans, trucks, motorcycles, buses, boats, airplanes, helicopters, drones, lawn mowers, recreational vehicles, amusement park vehicles, off-road vehicles, farm equipment (e.g., tractors), construction equipment, trams, golf carts, trains, and trolleys. Vehicle 100 is equipped with a plurality of LIDAR units 102. LIDAR is a surveying method that measures distance to a target by illuminating the target with pulsed laser light and measuring the reflected pulses with a sensor. Differences in laser return times or phase can then be used to make digital two-dimensional (2D) and/or three-dimensional (3D) representations of the target. LIDAR is used in range finding, land survey, factory automation, and autonomous vehicles. However, a 3D scanning LIDAR is extremely expensive and bulky which are disadvantages for automobile use.

Figure 1A:
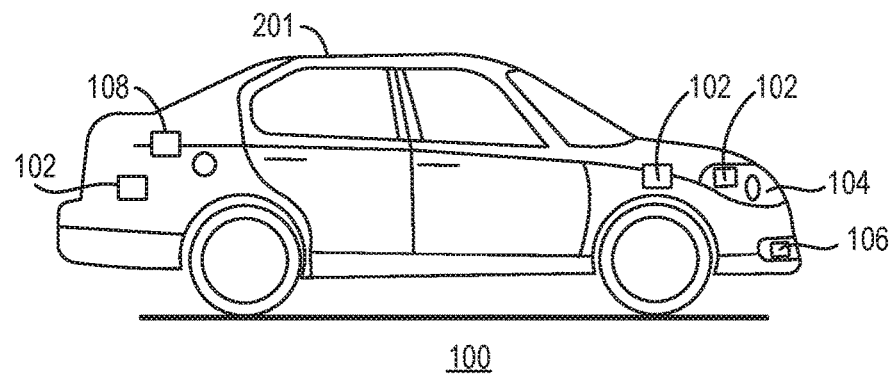
FIGS. 1A-1D show various views of an exemplary vehicle 100 utilizing the technology described herein.
Figure 1B:
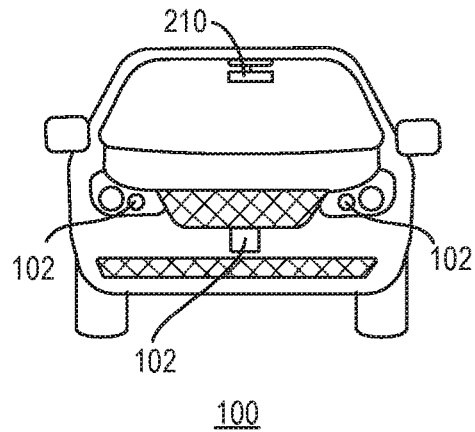
Figure 1C:
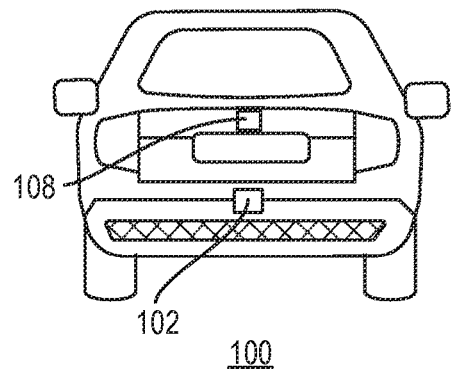
Figure 1D:
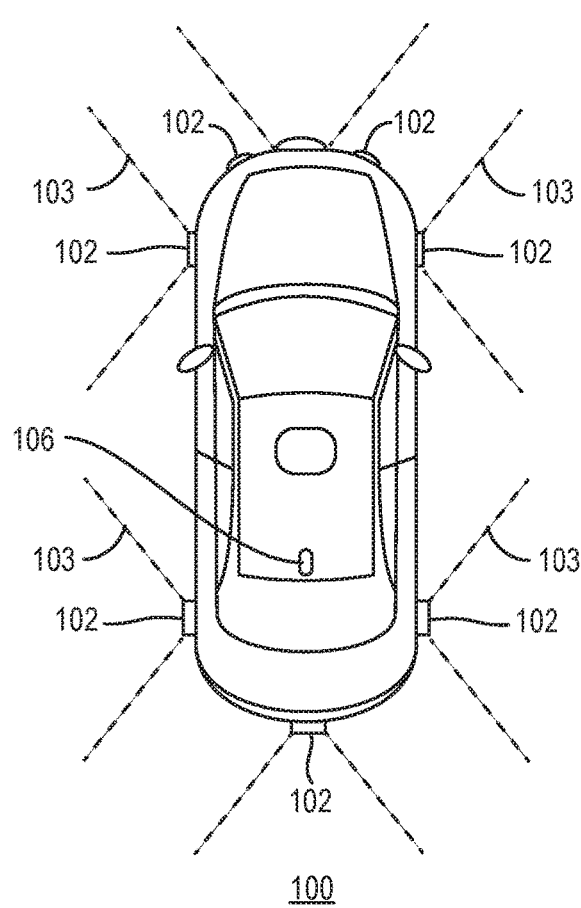
Figure 2A:
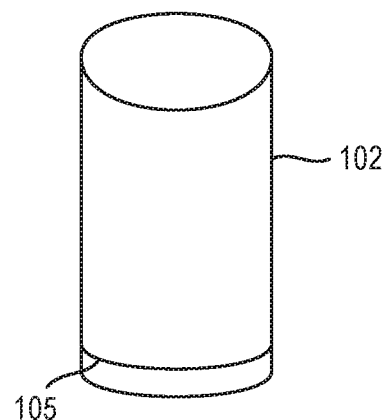
FIG. 2A is a close up view of a LIDAR unit 102 which may be mounted on or in a vehicle and has a cylindrical shape.
Figure 2B:
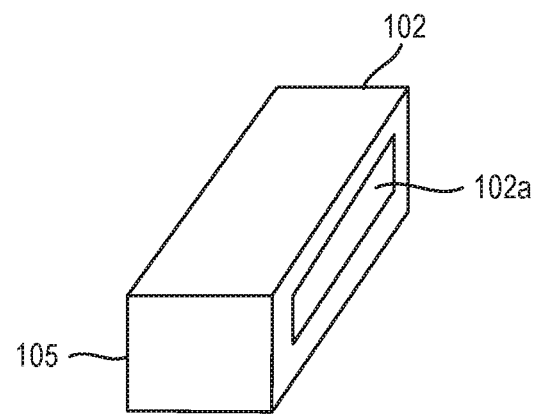
FIG. 2B shows a close up view of the exterior of a LIDAR unit 102 having a rectangular shape.
Figure 3:
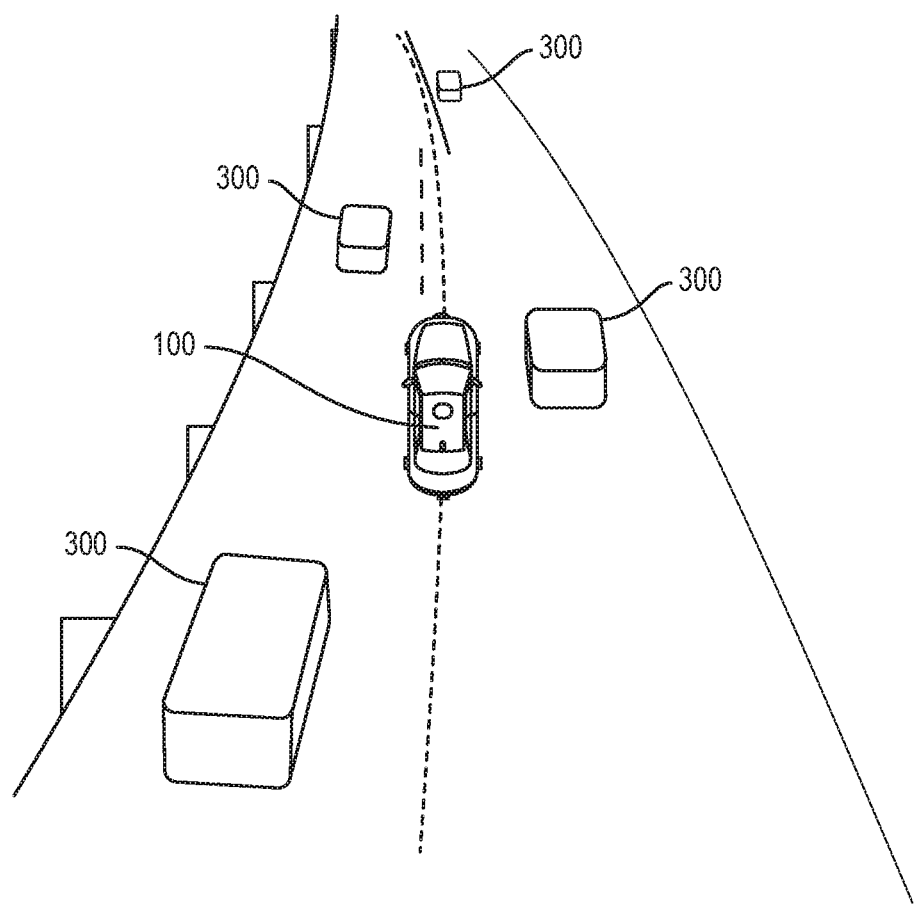
FIG. 3 illustrates lateral positioning of the vehicle 100 on a road detecting surrounding objects 300 (e.g., other vehicles), in accordance with an exemplary embodiment.

FIG. 1A shows a right side view of vehicle 100 equipped with a plurality of LIDAR units 102. FIG. 1B shows a front view of vehicle 100 with LIDAR units 102. FIG. 1C shows a back view of vehicle 100 with LIDAR units 102. FIG. 1D shows a top view of the vehicle 100 with LIDAR units 102. FIG. 2A is a close up view of a cylindrically shaped LIDAR unit 102 connected to a power and communications cable 105 which may be mounted on or in vehicle 100. FIG. 2B shows a close up view of another embodiment of the LIDAR unit 102 having a rectangular shaped housing with a LIDAR scanning window 102a. Reference 103 in FIG. 1D shows the width of the scanning area (or Field of View (FoV)) in a horizontal and vertical direction and distance of the LIDAR units 102. The vehicle 100 is further equipped with a wireless communication system 104, a camera 106 and an autonomous vehicle computing unit 108 to assist in autonomous operation. The wireless communication system 104 may be any system configured to wirelessly couple to one or more other automobiles, sensors, or other entities, either directly or via a wireless communication network (e.g., 4G and/or 5G). The camera 106 may be any camera (e.g., a still camera, a video camera, etc.) configured to capture images of the environment in which the vehicle 100 is located. A vehicle 100 may include any combination of global positioning system sensors, inertial measurement units, RADAR units, LIDAR units 102, cameras 106, lane detection sensors, and acoustic sensors which connect to the autonomous vehicle computing unit 108 and allow for autonomous (or semi-autonomous) driving. While the LIDAR units 102 are shown to be mounted in particular locations on the automobile 100, in some examples the LIDAR units 102 may be mounted elsewhere on the vehicle 100 including on top of the vehicle for a 360 degree view as well inside the vehicle 100. Further, while approximately ten LIDAR units are shown in FIGS. 1A-1D, in some examples more or less LIDAR units 102 may be used. The autonomous vehicle computing unit 108 which operates the vehicle 100 may be configured to receive from the LIDAR units 102 in FIGS. 1A-1D through cable 105 LIDAR-based information that may include a 2D and/or 3D point cloud. The 2D and/or 3D point cloud may include points corresponding to light emitted from the LIDAR units 102 and reflected from objects 300 on the road or in the vicinity of the road. FIG. 3 illustrates vehicle 100 on a road surrounded by a plurality of other objects or targets (e.g., vehicles) 300 in the vicinity of vehicle 100 which need to be detected to allow the autonomous vehicle 100 to operate and stay clear of them. As described with respect to the LIDAR unit 102 in FIGS. 1A-1D, operation of a LIDAR unit 102 may include an optical remote sensing technology that enables measuring reflected properties of scattered light to find range and/or other information of a distant target 300.

Each of the LIDAR units 102, for example, may be configured to emit laser pulses light beam and scanning the beam able to generate a 2D or 3D range matrices. In one example, the range matrices may be used to determine distance to an object or surface by measuring time delay between transmission of a pulse and detection of a respective reflected light signal. Each LIDAR unit 102 may be configured to scan an environment surrounding the vehicle 100 in three dimensions. The use of more than one LIDAR units 102 coupled to the vehicle 100 in an exemplary embodiment may scan a complete 360 degree horizon of the vehicle 100. The LIDAR unit 102 may be configured to provide to the autonomous vehicle computing device 108 a cloud of point data representing obstacles or objects 300, which have been hit by the laser of a LIDAR unit(s) 102 on the road and the vicinity of the road. The points may be represented by the LIDAR unit 102 to the computing unit 108 in terms of azimuth and elevation angles, in addition to range, which can be converted to (X, Y, Z) point data relative to a local coordinate frame attached to the vehicle 100. Additionally, the LIDAR units 102 may be configured to provide to the autonomous vehicle computing device 108 intensity values of the light or laser reflected off the obstacles 300 that may be indicative of a surface type of a given object. Based on such information, the autonomous vehicle computing device 108 may be configured to identify the objects 300 and characteristics of the objects such as type of the object, size, speed, whether the object is a traffic sign with a retroreflective surface, etc.

The LIDAR units 102 may be configured to use ultraviolet (UV), visible, or infrared light to image objects 300 and can be used with a wide range of targets, including non-metallic objects. In one embodiment, a narrow laser beam can be used to map physical features of an object 300 with high resolution. Also, in some embodiments, wavelengths in a range from about 10 micrometers (infrared) to about 250 nanometers (UV) could be used to form a beam by the LIDAR units 102. Typically light is reflected via backscattering. Different types of scattering may be used for different LIDAR applications, such as Rayleigh scattering, Mie scattering, Raman scattering, and fluorescence. Based on different kinds of backscattering, the LIDAR units 102 could be accordingly called Rayleigh LIDAR, Mie LIDAR, Raman LIDAR and sodium (Na)/iron (Fe)/potassium (K) Fluorescence LIDAR. Suitable combinations of wavelengths can allow for remote mapping of objects by looking for wavelength-dependent changes in intensity of reflected signals. In a vehicle application, a plurality of LIDAR units 102 may use a beam steering method to convert a basic LIDAR unit 102 from a single point distance measure data into a time dependent two or three dimensional LIDAR data cloud.

Figure 4:
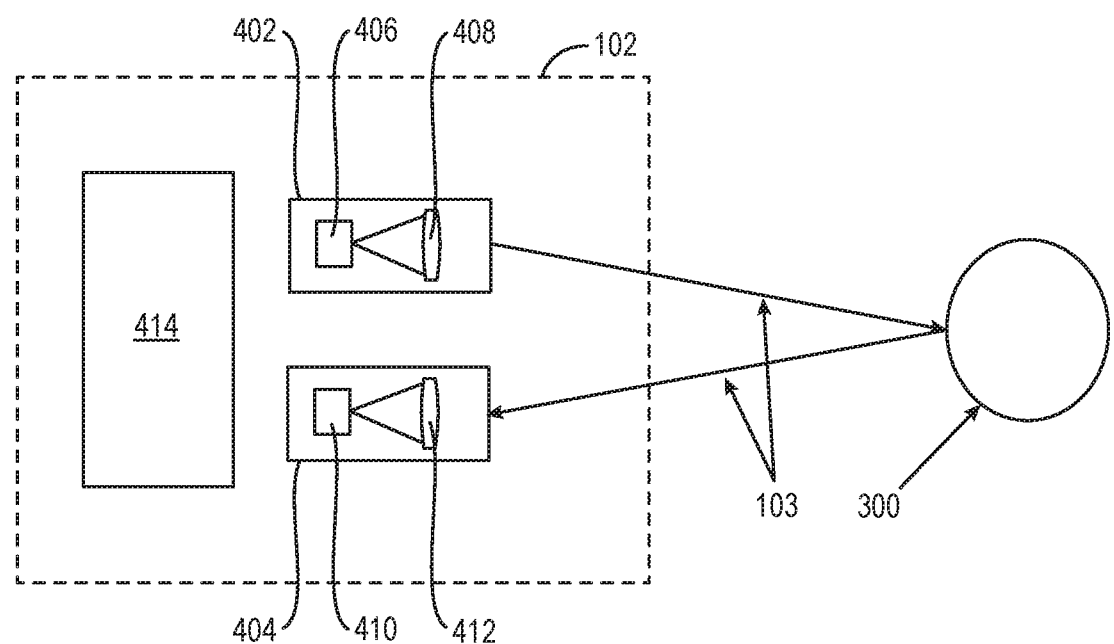
FIG. 4 shows a detailed view of some of the elements of an exemplary LIDAR unit 102 detecting the distance and shape of an object 300.

FIG. 4 shows a detailed view of some of the elements of the LIDAR unit 102 detecting the distance of an object 300. (LIDAR unit 102 may also be called a rangefinder). Each LIDAR unit 102 has a transmitter 402 and a receiver 404. Transmitter 402 includes a pulsed laser diode (PLD) 406 and a laser collimator lens 408. Receiver 404 includes an avalanche photo diode (APD) sensor 410 and optical focus lens 412. The collimator lens 408 projects pulsed laser light from PLD 406 to distant object 300. The pulsed laser light beam 103 passes through collimator lens 408 and is transmitted to distant object 300 at a speed of approximately 0.3 meter per nanosecond. A reflected signal from object 300 is received by the focus lens 412 which may have approximately ¼" to 1" effective optical aperture to guaranty enough return light is received at APD 410. The focus lens 412 is tuned such that is focused on the transmitted light spot on object 300. Time to digital conversion microchip 414 coupled to the transmitter 402 and receiver 404 and maybe located in a separate housing. Microchip 414 calculates time of flight of light of scan beam 103 from PLD 406 to object 300 and return to APD 410. The scan beam 103 may have, for example, an exit pupil of approximately 3 to 4 millimeters (mm). The LIDAR unit 102 can easily measure up to approximately 1000 yards. The optical aperture is like the pupil of human eye, the larger the aperture the more return light from object 300 is able to be received by the focus lens 412, hence the longer distance can be detected.

Figure 5A:
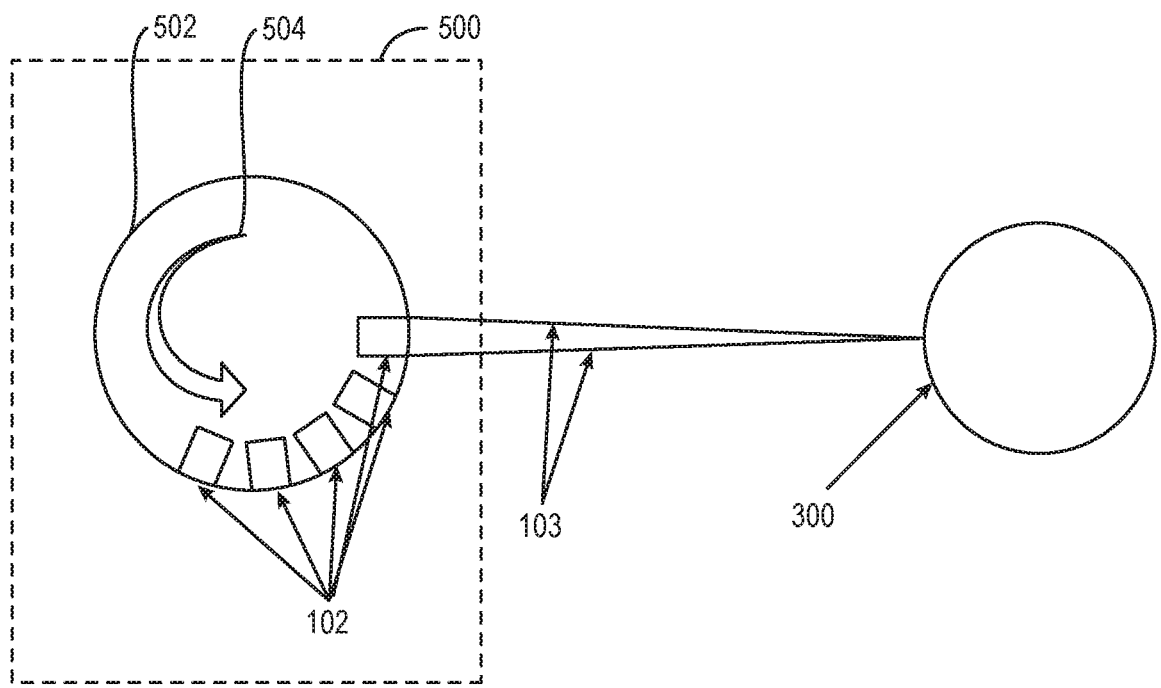
FIG. 5A shows a top view and FIG. 5B shows a side view of an alternative embodiment LIDAR system 500 which includes a plurality of LIDAR units 102 mounted on a rotary motor stage 502 to steer laser beam 103.
Figure 5B:
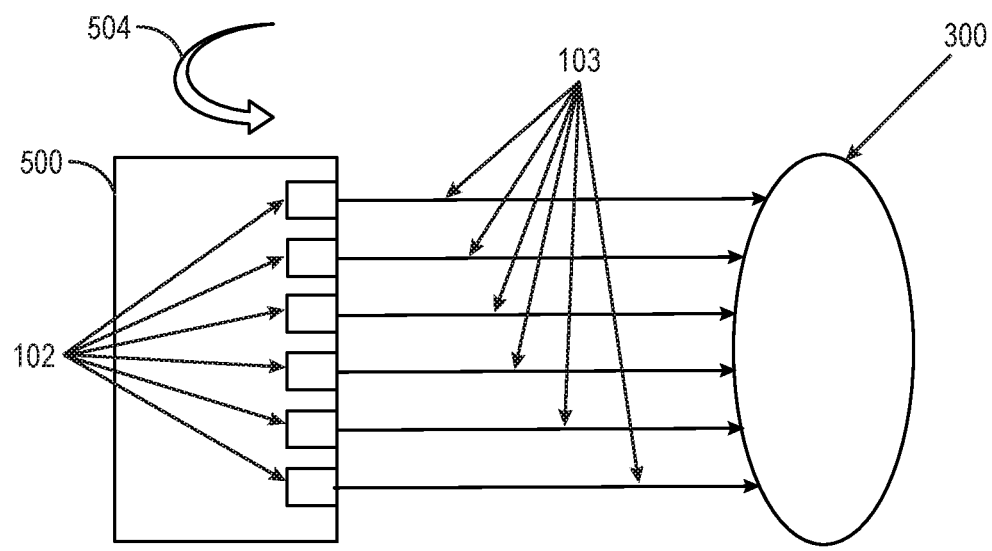

FIG. 5A shows a top view an alternative embodiment LIDAR system 500 which includes a plurality of LIDAR units 102 mounted on a rotary motor stage 502 to steer laser beam 103. FIG. 5B shows a side view of FIG. 5A. The rotary LIDAR system 500 may be very bulky and difficult to install into an automobile bumper or light fixture so instead it is typically mounted on top of a vehicle to obtain a clear 360 degree view. In this system 500, laser beam 103 is steered by rotating motor stage 502 in the direction of arrow 504. A LIDAR system for automobile purposes may deploy up to (and including) approximately 128 LIDAR units 102 on the rotary motor stage 502 which offers a 360 degree scan view, the result is up to 128 scanned lines divided the targeted field of view. This type of rotary LIDAR system 500 is sufficient up to approximately a ½ inch optical aperture for receiver lens 412 (shown in FIG. 4) to capture return light. Each LIDAR unit 102 point distance measurement data is converted into a 2D or 3D profile data cloud. A 16 line rotary LIDAR with 32 degree targeted vertical FoV is divided into 16 lines resulting 2 degrees vertical system resolution.

Figure 6A:
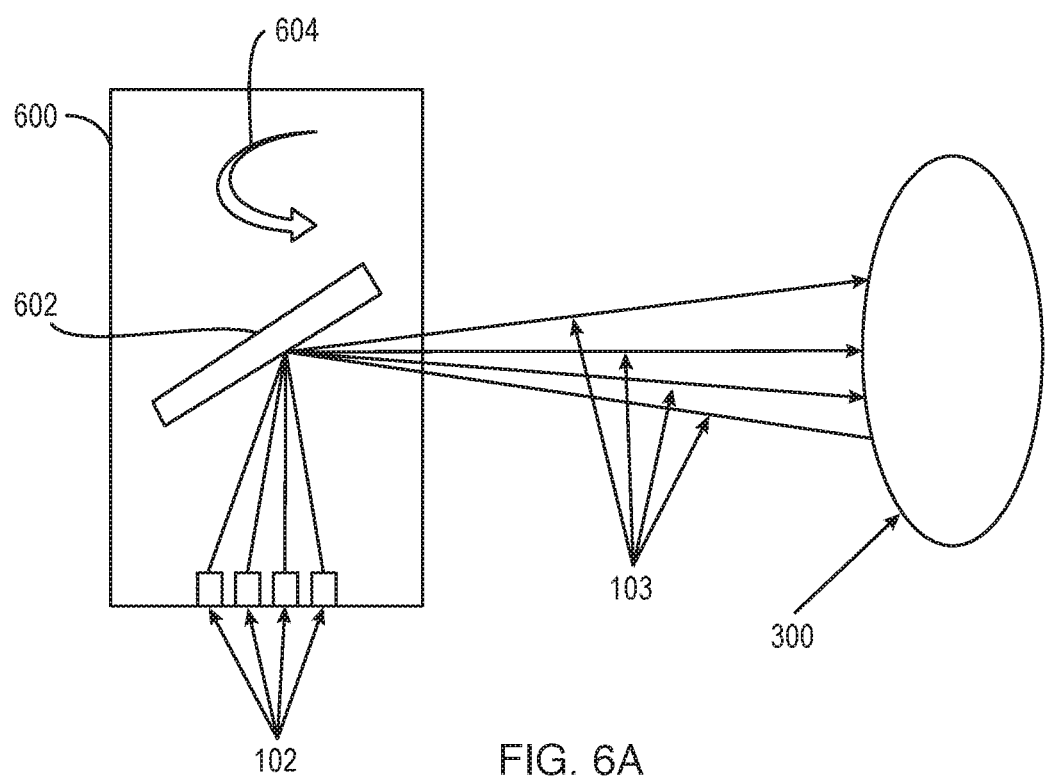
FIG. 6A shows an embodiment of a rotary beam steering mirror LIDAR system 600 wherein a plurality of LIDAR units 102 share at least one BSM assembly 602.

FIG. 6A shows an embodiment of a rotary beam steering mirror LIDAR system 600 where a plurality of stationary LIDAR units 102 share one rotary BSM assembly 602 which may rotate counter clockwise according to arrow 604. The multiline LIDAR assembly 600 has been built with up to a plurality of LIDAR units 102 (e.g., 128 LIDAR units). Collimate laser beams of the LIDAR units 102 share a small mirror surface of the BSM assembly 602 and the return light shares the majority mirror surface of the BSM assembly 602. The optical aperture is guaranteed by the BSM assembly 602 and LIDAR units 102 focus the lens size. Each LIDAR unit 102 has a vertical angle offset to cover a desired scan line.

Figure 6B:
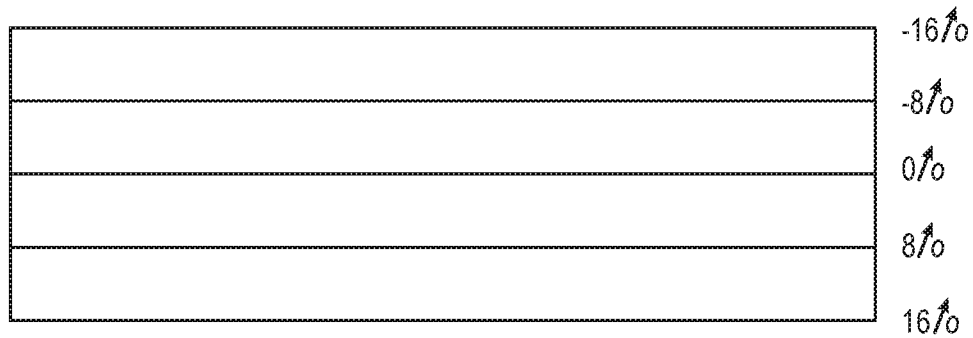
FIG. 6B shows each LIDAR unit 102 scanning only one line of the 4 lines of the entire field of view for a total of four lines in FoV.

For example, a 4 line rotary LIDAR with 32 degree targeted vertical FoV is divided into a four lines. This will result in 8 degrees vertical system resolution. FIG. 6B shows each LIDAR unit 102 scanning only one line of the 4 lines of the entire field of view for a total of four lines in FoV.

Figure 7:
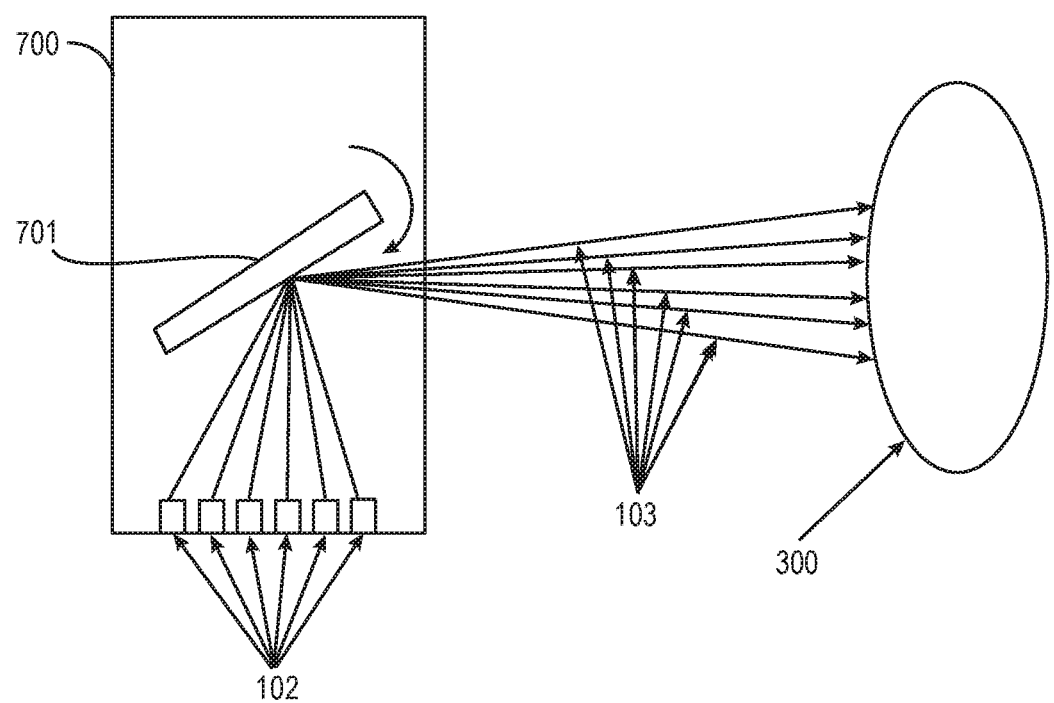
FIG. 7 shows an embodiment of a LIDAR system 700 with dual axis resonating flexure motor beam steering mirror (BSM) assembly 701. The word motor is used because the resonating motion may be achieved by electro-magnetic force.

FIG. 7 shows an embodiment of a LIDAR system 700 with a beam steering mirror (BSM) assembly 701 having a beam steering mirror. In LIDAR system 700, a plurality of LIDAR units 102 share the BSM assembly 701 which moves backward and forward according to the arrow shown in FIG. 7 to scan object 300. In automobile LIDAR systems, a pair of galvanometers may be deployed in the system 700. The optical aperture is guaranteed by the beam steering mirror of BSM assembly 701 and focus lens size. In this embodiment, light from LIDAR units 102 are transmitted on the first galvanometer to scan azimuth direction then transmitted to the second galvanometer to scan altitude direction. However, a negative aspect of this method is that a galvanometer is a mechanical system with frictional moving parts. This type of LIDAR system is generally bulky like the rotary mechanical LIDAR system 500 of FIGS. 5A and 5B.

A MEMS version of the BSM assembly 701 of FIG. 7 may be used in an automobile LIDAR solution. The MEMS version of the BSM assembly 701 is capable of resonating up to approximately 1000 Hertz (Hz). The advantage of the MEMS version of the BSM assembly 701 is that it has a compact size, is semi-solid and does not contain any frictional moving parts. The MEMS version of the BSM assembly 701 may also be manufactured using semiconductor fabrication processes. BSM assembly 701 may have a mirror suspended through a single crystal silicon torsion spring(s) by actuator arms. The MEMS version of the BSM assembly 701 is considered as a solid state system. One of the biggest problems of MEMS version of the BSM assembly 701 is the system effective optical aperture is less than 3 millimeter (mm). Therefore, the MEMS versions of the BSM assembly 701 is not able to efficiently collect return light on the same transmission mirror. While a separate receiver lens is a substitute, the receiver lens cannot not focus on the transmitted light spot while scanning. This results in a low effective optical aperture which limits the MEMS version of the LIDAR system 700 return signal strength. (Another way of describing this is that the electric system signal/noise ratio is very low, resulting in limited detection distance).

Figure 8A:
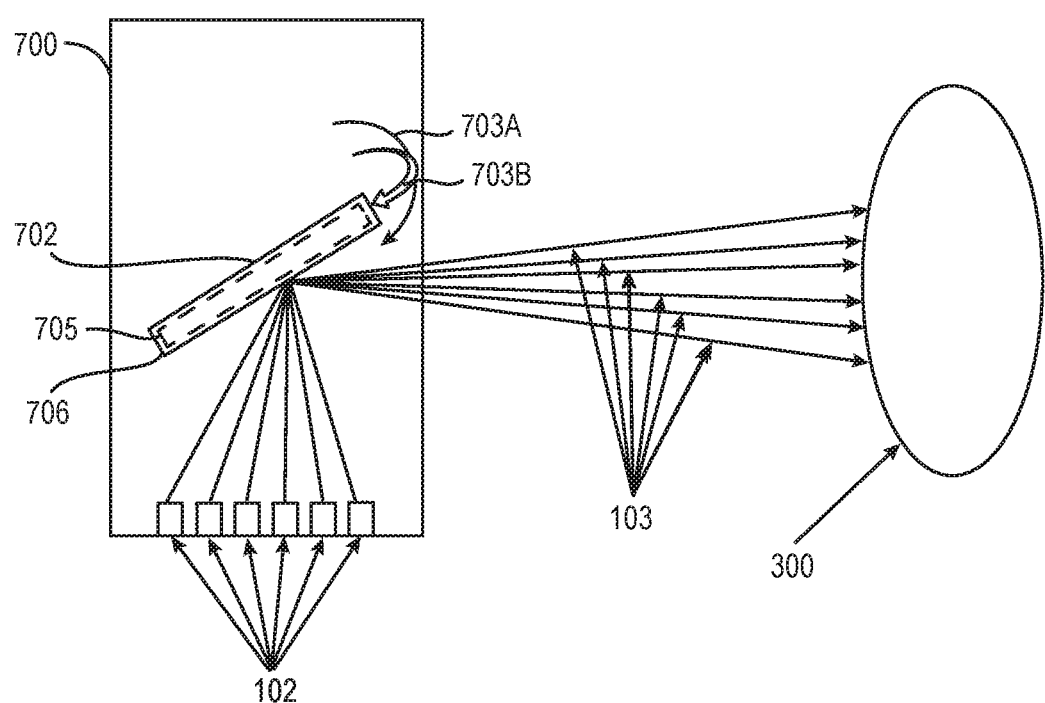
FIGS. 8A-8C show an embodiment of the dual axis resonate (or tip-tilt) beam steering mirror LIDAR system 700 having a plurality of LIDAR units 102 which share one BSM assembly 702.
Figure 8B:
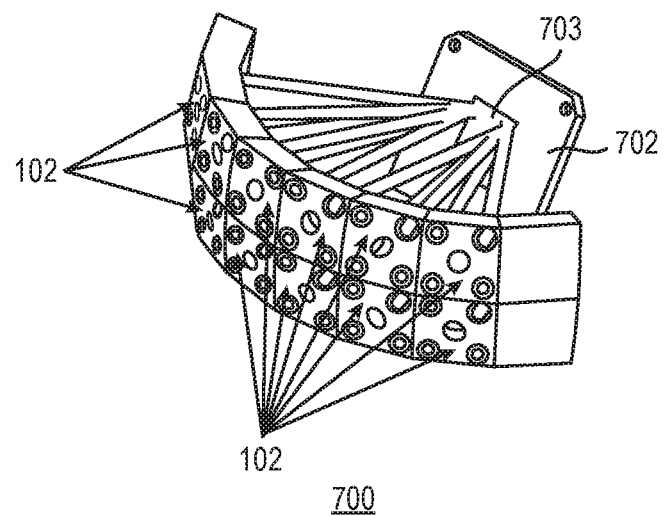

FIGS. 8A and 8B shows a dual-axis resonate motor configuration alternative embodiment of the beam steering mirror LIDAR system 700. Compared to conventional motors which rotate in a 360 degree rotation (i.e., a complete circle), a resonate motor is one wherein a rotor is moving in a tip-tilt or backward-forward resonating motion (i.e., rotor does not rotate in a complete circle). The differences between MEMS BSM assembly 701 and dual axis resonate motor BSM assembly 702 may include, but are not limited to, the following. First, the dual axis resonate motor BSM assembly 702 may offer up to ten times more effective optical aperture compared to MEMS. The returned reflected laser light is one magnitude stronger than MEMS BSM assembly 701 which is sufficient for automobile distance detection. Second, dual axis resonate motor (BSM assembly 702 can be fabricated at very low cost. Moreover, MEMS BSM assembly 701 is typically made of single crystal silicon which costs a lot more. Third, MEMS is driven by electro-static force versus dual axis resonate motor BSM assembly 702 being driven by electro-magnetic force (as discussed in formula number 1 below). A resonate BSM torsion spring used in the BSM assembly 702 may be made of metal such as titanium, stainless steel, steel and alloys.

Figure 8C:
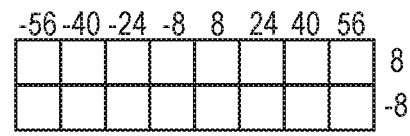

FIGS. 8A and 8B shows the dual axis resonating (or tip-tilt) beam steering mirror LIDAR system 700 having a plurality of LIDAR units 102 (preferably 6 units or greater) which share a single BSM assembly 702. BSM assembly 702 steers time dependent, sequentially transmitted laser lights from the plurality of LIDAR units 102 and converts distance measuring data of the distant object into a three dimensional scanned data cloud. "Resonating" is used herein to mean the beam steering mirror 703 tips and tilts backward and forward along a first axis (arrow 703a) and a second axis (arrow 703b) as shown in FIG. 8A. BSM assembly 702 is able to resonate in a range up to plus or minus (+/−) approximately 20 degrees. However, BSM assembly 702 is able to resonate in a range up to plus or minus (+/−) approximately 5 degrees mechanically without fatigue, but which is not enough for an automobile application. Therefore, one solution is to divide the expected system field of view as pixels and use a plurality of LIDAR units (e.g., 6 LIDAR units) with each of the plurality of LIDAR unit covers one pixel as illustrated by FIG. 8C. FIG. 8C shows a 2×6 pixel system with each pixel covering a minute fractional Field of View (FoV) of 16×16 degrees of the LIDAR system 700 targeted FoV of 32×96 degree altitude×azimuth. As discussed below, the mirror 703 rests on a first rotor 705 and a second rotor 706 located inside the BSM assembly 702 which move substantially perpendicular to each other to allow the mirror 703 to move in two dimensions. Mirror 703 scans each individual LIDAR unit 102 point measurement data into a 3D (i.e., distance, altitude, azimuth angle) data cloud. Each LIDAR unit 102 may have 16 degrees angular offset progressively referenced to the BSM assembly 702 and to adjacent each other to scan a targeted field of view (FoV) of 32×96 degree altitude (first axis)×azimuth (second axis)).

Figure 9A:
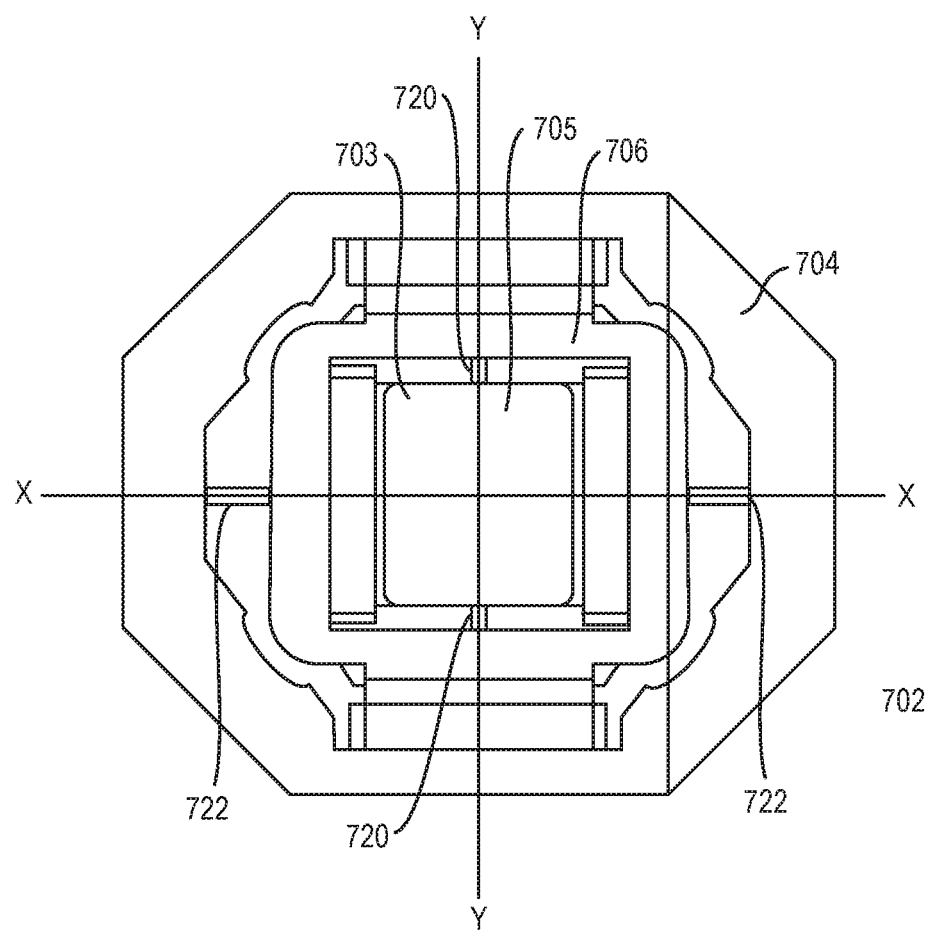
FIG. 9A shows a top view of the BSM assembly 702 of FIGS. 8A and 8B.

FIG. 9A shows a top view of the BSM assembly 702 of FIG. 8A. The term "rotor" will be used herein to denote a rotary part of the resonating (or tip-tilt) BSM assembly 702 and the term "stator" is used herein to denote a relatively stationary part of the BSM assembly 702. A beam steering mirror 703 is mounted on the first rotor 705 of BSM assembly 702 and rotates correspondingly on a first torsion spring axis marked Y-Y on FIG. 9A. The first rotor 705 rotates (or moves) in reference to a second rotor 706. The second rotor 706 is stationary in relation to the first rotor 705, but rotates (or moves) in reference to stator 704 marked as a second torsion spring axis X-X on FIG. 9A. As shown in FIG. 9A, first torsion spring axis Y-Y is substantially perpendicular to second torsion spring axis X-X. In this configuration, the beam steering mirror 703 is able to effectively rotate on two axes—the X and Y axes.

As further shown in FIG. 9A, first rotor 705 is supported by second rotor 706 through first torsion springs 720 and able to rotate coaxially about the first torsion springs 720 freely on axis Y-Y. The second rotor 706 is supported by stator 704 through second torsion springs 722. The second rotor 706 is also able to rotate coaxially about the second pair of torsion springs 722 freely on axis X-X. The first torsion springs 720 and second torsion springs 722 may or may not be made of one integrated piece even they are called by separate part numbers in the drawings.

Figure 9B:
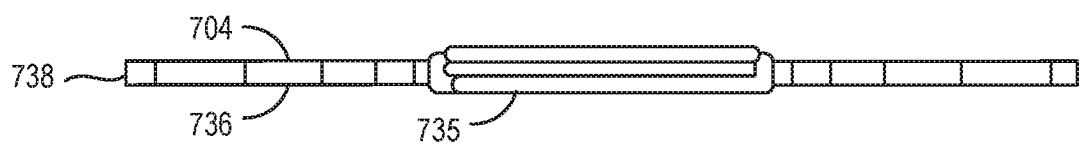
FIG. 9B is an exploded side view of the BSM assembly 702.
Figure 9B:
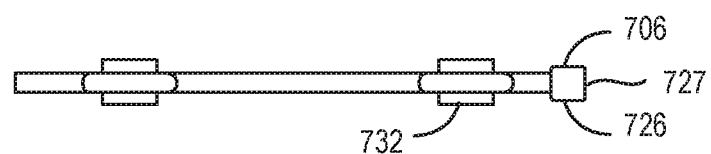
Figure 9B:
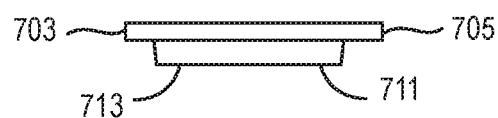
Figure 9B:
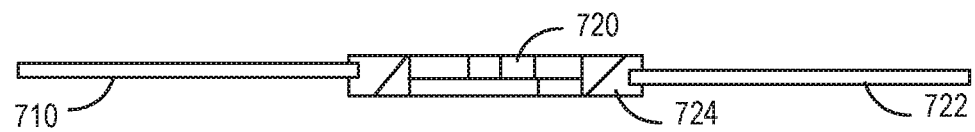
Figure 9B:
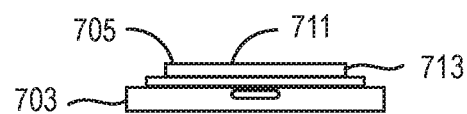
Figure 9B:
Figure 9B:
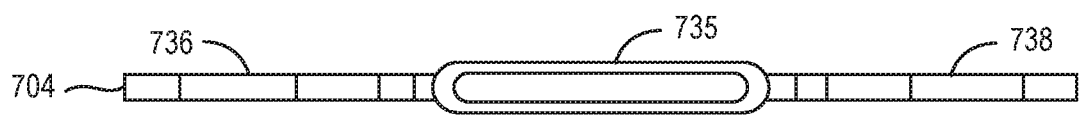

FIG. 9B is an exploded side view of one of the BSM assembly 702. From a constructional point of view, the dual axis resonate motor (tip-tilt) BSM assembly 702 comprises a stator 704 (each half body shown), first rotor 705 (each half body shown), second rotor 706 (each half body shown), and inner core assembly 710. The half bodies are all symmetrically placed around the inner core assembly 710. Stator 704 half body comprises stator spacer 736, stator flux layer 738 and second electric coil 735. First rotor 705 half body comprises mirror 703, first rotor spacer 711, and first rotor flux layer 713. Second rotor 706 half body comprises second rotor spacer 726 and second flux layer 727 and first electric coils 732. First rotor spacer 711, second rotor spacer 726 and stator spacer 736 create free space for corresponding torsion springs 720 and 722 to rotate mechanically undisturbed. The spacers 711, 726 and 736 and flux layers 713, 727, and 738 functionally conduct magnetic flux and couple corresponding first electric coil 732 to first magnets 724 and second electric coil 735 to second magnets 728 magnetically. Each of the half bodies shown in FIG. 9B can be constructed in one integrated piece or as multiple layers using lamination manufacturing, spot welding, and/or riveting methods. There may be two mirrors 703 each attached to one side of the first rotor with epoxy, the purpose is to keep first rotor moment of inertia on the center of rotation. The beam steering mirror 703 may having dimensions in a first axis in a range of approximately 10 mm to 30 mm (preferably in a range of 14 mm to 20 mm) and a second axis approximately 10 to 30 mm (again, preferably in a range of approximately 14 mm to 20 mm).

Figure 9C:
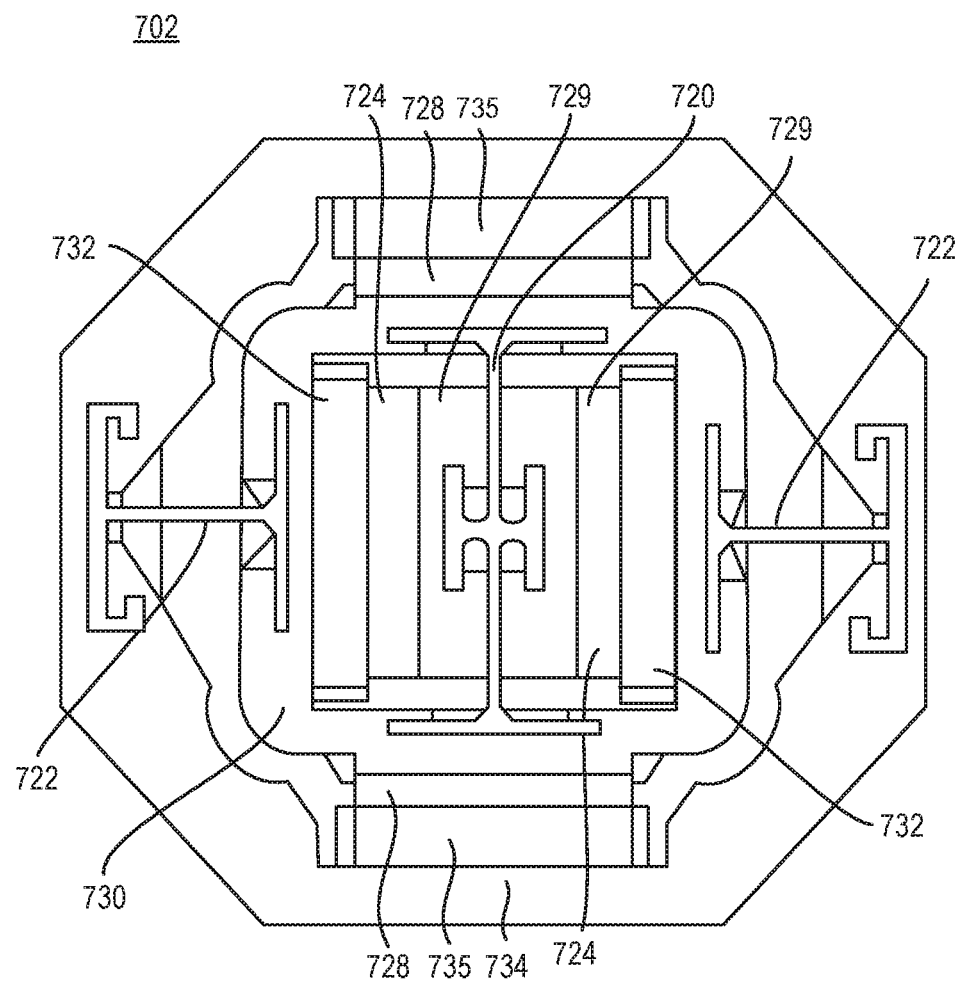
FIG. 9C is a top view of the core assembly 710 of BSM assembly 702.

FIG. 9C is a top view of the core assembly 710. From a structural point of view first rotor 705 further comprises first torsion springs 720, first magnets 724, first inserts 729 and is sandwiched in by the first rotor 705 half bodies. The first rotor 705 half bodies are symmetrically placed on both sides to ensure the moment of inertia of the first rotor 705 is on the rotational axis to reduce vibration. First inserts 729 (and second inserts 730) connect two half bodies, and allow two half bodies welded together and fill up the space elevated by torsion spring thickness.

Second rotor 706 comprises second torsion springs 722, second magnets 728, and second inserts 730. Second rotor 706 is made up of second rotor 706 half bodies which are symmetrical on both sides to ensure the moment of inertia of the second rotor 706 is on the rotational axis to reduce vibration. The first electric coil 732 and second electric coil 735 may be made of electric conductive material such as copper, silver, aluminum and gold. First torsion springs 720 and second torsion springs 722 may be made of titanium, ferroalloy, or alternative materials with preferred elasticity, fatigue character.

As shown in FIG. 9C, first magnets 724 on the first rotor 705 are intended to avoid heat generation. The magnetically coupled first magnets 724 and first electric coil pair 732 in an alternative embodiment can also be exchanged in place so that first magnets 724 are on second rotor 706 and first electric coil 732 is on first rotor 705 which would result in a moving coil configuration. A moving coil configuration generally reduces rotor weight to achieve higher system resonant frequency, but the downside is that the heat generated from electric current is more difficult to dissipate. In another alternative embodiment, the first magnets 724 and second magnets 728 may be eliminated and replaced with silicon steel which will end up in a reluctance motor configuration. A reluctance motor is a magnetically permeable motor rotor substantially naturally aligned with a stator magnetic flux path resulting in torque on the rotor. A resonate motor can be a magnetic rotor or reluctance rotor depending on if there are magnets or not. The dual axis resonate motor beam steering mirror 703 may range up to approximately 20 degrees of rotational freedom. The first rotor 705 rotates in reference to second rotor 706 through a connected first torsion spring 720 axis. The second rotor 706 is also stationary with regard to the first rotor 705 and the second rotor 706 rotates in reference to stator 704 through connected a second torsion spring 722 axis and is substantially perpendicular to first torsion spring 720 axis. Alternating electric current energizes the electric coils 732 and 735 to create electromagnetic force to resonate the rotors 705 and 706 coaxially along the torsion spring axis. The cross referenced or linked two axis torsion springs configuration is one of the elements that allow the BSM assembly 702 to function.

In operation, while first electric coils 732 are energized, torque is generated on electro-magnetically coupled first magnets 724. Torque is transferred from first magnets 724 to deforming (or twisting) first torsion spring(s) 720, which forces the first rotor 705 to rotate around first pair of torsion springs 720 and in return rotates mirror 703. Based on the Lorenz force law, the first rotor 705 tips backward on first torsion spring(s) 720 if first electric coils 732 are energized cyclically. First rotor 705 would have a natural resonant frequency where a minimum of energization is required to reach maximum rotational angular displacement. As discussed above, in one embodiment the resonating frequency of the first rotor 705 reaches up to (and including) approximately 600 Hz. While in resonate configuration, magnets are not absent and the magnetically permeable first rotor tends to align to magnetic field generated by energized first electric coil 732.

FIG. 9C further shows the magnetically coupled second magnets 728 and second electric coil 735 pair working on the same principle. In one exemplary embodiment the resonating frequency of the second rotor 706 reaches up to (and includes) approximately 120 Hz.

Figure 9D:
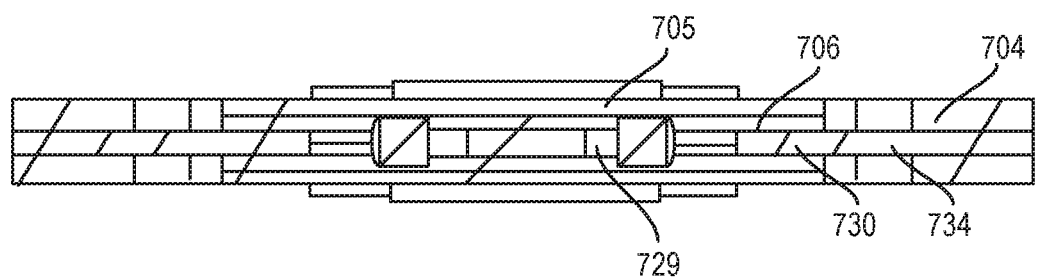
FIG. 9D shows a side view of the dual axis resonate (or tip-tilt) BSM assembly 702.

FIG. 9D shows a side view of the dual axis resonate motor (or tip-tilt) BSM assembly 702. First insert 729 and first rotor 705 half bodies may be resistance welded and/or riveted together. Correspondingly, second insert 730 and second rotor 706 half bodies may also be resistance welded and/or riveted together. Stator insert 734 and stator 704 half bodies may also be resistance welded and/or riveted together as well. Inserts 729, 730, and 734 enable resistance welding to integrate half bodies from both sides of core assembly 710 mechanically into one unified body to increase mechanical integrity and create magnetic via to let magnetic flux flow evenly cross the half bodies. This resistance welding and/or riveting process also integrates first torsion spring 720 and second torsion spring 722 with each half body as one mechanical body. The inserts allow magnetic flux flow to core area otherwise occupied by nonmagnetic flexure core material. The integrated body offers unified magnetic flux path and mechanical mounting method for magnets (724 and 728), electric coils (732 and 735) and mirror 703 aside from epoxy bonding. The half bodies are described here may be made of laminated electric steel for description of functionality to perform flux guiding and housing the inner core assembly 710. They can also be fabricated by alternative methods such as press forming, machining, stamping, and consequently may take very different physical forms.

Figure 10:
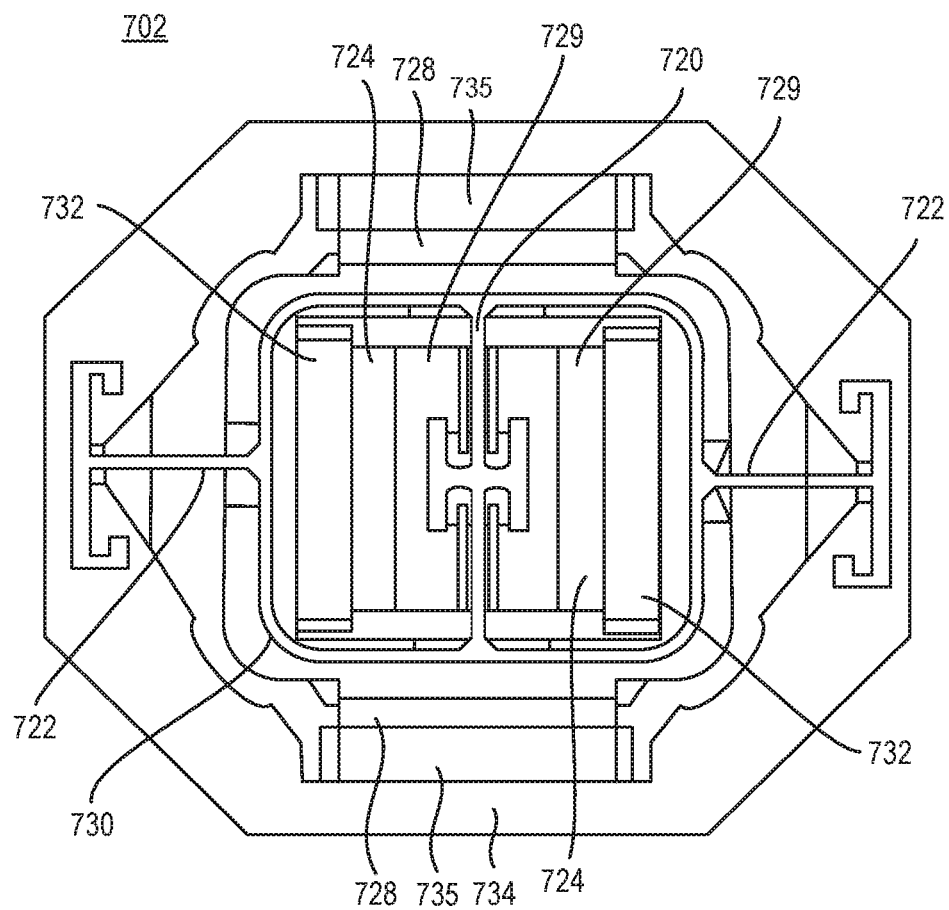
FIG. 10 shows an embodiment of the BSM assembly with an integrated magnetically permeable flexure core.

FIG. 10 shows one embodiment of a top view of an inner core assembly 710 with integrated torsion springs (720 and 722). The first and second torsion springs (720 and 722) may be interconnected as one integrated piece without effecting functionality. The second inserts (729 and 730) may have a different shape accordingly.

Lorentz Force Law (shown below) allows the energized electric coils 732 and 735 electro-magnetically coupled with rotors (705 and 706) through magnetic interaction to create torque on the rotors (705 and 706), and alternating electric current to create resonate rotor motion.

$$\vec{F} = q\vec{v} \times \vec{B}$$

Force generated from torsion spring 720 and 722 displacement and reluctance force from magnets displacement act as a counter reaction force of the resonate movement. The resonate (tip-tilt) BSM assembly 702 has a resonating nature and is described in the following formula number 1:

$$m\frac{d^2x}{dt^2} + c\frac{dx}{dt} + kx = F(t)$$

where M is moment of initial of the rotor; C is corresponding air damping force; K is torsion spring K factor plus rotor reluctance; and F(t) is electromagnetic force created from an electric coil (i.e., first coil 732 and/or second coil 735). The acting force, reacting force and initial force of the first rotor 705, together with torsion springs and air damping forces result in a mechanical resonating system according to formula number 2 (shown below). Both resonate (tip-tilt) BSM assembly 702 will reach its maximizing efficiency at natural resonate frequency if properly designed at:

$$f = \frac{1}{2\pi}\sqrt{\frac{k}{m}}$$

In one embodiment, the resonate (or tip-tilt) BSM assembly 702 first rotor harmonic frequency can range up to (and include) approximately 360 Hz, with two 14 mm×18 mm×1 mm optical mirrors 703. The achievable tip tilt angle may be limited by Young's modulus, yield strength, in one configuration it allows up to 15 degrees. However, specific material fatigue properties may limit how much angle can be achieved to be used as torsion spring. The resonate (tip-tilt) of +/− in a range of approximately 5 to 20 degrees (may be achieved with titanium torsion springs (for first and second torsion springs 720, 722) and +/− approximately 2 degrees for carbon steel torsion springs.

As disclosed herein, the dual axis resonate motor (tip-tilt) BSM assembly 702 has ½ inch or over optical aperture. The BSM assembly 702 utilizes torsion springs 720 and 722 to act as a beam steering mirror rotational shaft to resonate the BSM assembly 702.

Note that the LIDAR units 102 shown mounted around the vehicle 100 in FIGS. 1A-1D may each be replaced with the BSM system 700 described herein. The BSM system may also be mounted on top of the vehicle 100 for a 360 degree view.

Aspects of the embodiments of this disclosure are illustrated by way of example. While various details of one or more techniques are described herein, other techniques are also possible. In some instances, well-known structures and devices are shown in block diagram form in order to facilitate describing various techniques. A further understanding of the nature and advantages of examples provided by the disclosure can be realized by reference to the remaining portions of the specification and the drawings, wherein like reference numerals are used throughout the several drawings to refer to similar components. In some instances, a sub-label may be associated with a reference numeral to denote one of the multiple similar components. When reference is made to a reference numeral without specification to an existing sub-label, the reference numeral refers to all such similar components.

Recitation of ranges of values herein are merely intended to serve as a shorthand method of referring individually to each separate value falling within the range, unless otherwise indicated herein, and each separate value is incorporated into the specification as if it were individually recited herein. Therefore, any given numerical range shall include whole and fractions of numbers within the range. For example, the range "1 to 10" shall be interpreted to specifically include whole numbers between 1 and 10 (e.g., 1, 2, 3, . . . 9) and non-whole numbers (e.g., 1.1, 1.2, . . . 1.9). In particular in this disclosure, when discussing the range of motion of the beam steering mirror 703 a range of degrees are discussed herein. When discussing ranges using the phrase "up to" a certain number, it shall mean 0 to the certain number including whole numbers and non-whole numbers.

The methods, systems, and devices discussed above are examples. Various embodiments may omit, substitute, or add various procedures or components as appropriate. Also, features described with respect to certain embodiments may be combined in various other embodiments. Different aspects and elements of the embodiments may be combined in a similar manner. Also, technology evolves and, thus, many of the elements are examples that do not limit the scope of the disclosure to those specific examples.

Also, some embodiments were described as processes. Although these processes may describe the operations as a sequential process, many of the operations can be performed in parallel or concurrently. In addition, the order of the operations may be rearranged. A process may have additional steps not included in the figures. Also, a number of steps may be undertaken before, during, or after the above elements are considered.

Having described several embodiments, various modifications, alternative constructions, and equivalents may be used without departing from the spirit of the disclosure. For example, the above elements may merely be a component of a larger system, wherein other rules may take precedence over or otherwise modify the application of the system. Accordingly, the above description does not limit the scope of the disclosure.

To aid the Patent Office and any readers of any patent issued on this application in interpreting the claims appended hereto, applicants wish to note that they do not intend any of the appended claims or claim elements to invoke 35 U.S.C. 112(f) unless the words "means for" or "step for" are explicitly used in the particular claim.

The invention claimed is:

1. A Light Imaging, Detection and Ranging (LIDAR) system comprising:
   at least one rangefinder unit;
   a beam steering mirror (BSM) assembly having a beam steering mirror mounted on a first rotor with approximately plus or minus 20 degrees of mechanical rotational freedom, a first pair of torsion springs forming a first axis upon which the first rotor rotates together with the beam steering mirror, a second pair of torsion springs forming a second axis with approximately plus or minus 20 degrees of mechanical rotational freedom, upon which the first rotor, second rotor and the beam steering mirror rotate with a stator providing a stationary platform for the first and second rotors, and a first electric coil and a second electric coil providing a force to cause the BSM to rotate;

wherein the BSM assembly is capable of transmitting light from the at least one rangefinder unit on the beam steering mirror having dimensions in a first axis of greater than approximately 10 millimeters (mm) and a second axis of greater than approximately 10; and wherein the beam stirring mirror is configured to resonate from an electromagnetic force on the first axis and the second axis to achieve it a range of approximately negative 20 degrees to plus 20 degrees on both the first axis and the second axis.

2. The system of claim 1, further comprising:
a plurality of rangefinder units wherein each of the rangefinder units are placed at different incidence angles in reference to the BSM assembly and each of said plurality of rangefinder units cover a fractional field of view of said LIDAR system field of view.

3. The system of claim 1 wherein the BSM assembly is capable of steering time dependent, sequentially transmitted laser lights from the at least one rangefinder unit and converts distance measuring data of the distant object into a three dimensional scanned data cloud.

4. The system of claim 1 wherein said first rotor is connected with said second rotor through said first torsion springs and is able to resonate coaxially about said first torsion spring while induced by at least one energized first electric coil.

5. The system of claim 1 wherein said second rotor is connected with said stator through said second pair of torsion springs and is able to resonate coaxially about said second torsion spring while induced by at least one energized second electric coil.

6. The system of claim 1 wherein the first rotor is capable of rotating in reference to the second rotor, the second rotor is stationary with respect to the first rotor, and the second rotor is capable of rotating in reference to the stator so that the beam steering mirror and first rotor are able to rotate on two axes.

7. The system of claim 1:
wherein said first rotor comprises at least one torsion spring, at least one insert, at least one spacer, and at least one flux layer wherein said at least one spacer, and at least one flux layer are placed on both sides of the first torsion spring; and
wherein said second rotor comprises at least one torsion spring, at least one insert, at least one spacer, and at least one flux layer wherein said at least one spacer, and at least one flux layer are placed on both sides of the second torsion spring.

8. The system of claim 1 wherein said stator comprises at least one insert, at least one spacer, and at least one flux layer and wherein said at least one spacer, and at least one flux layer are placed on both sides of the second torsion spring.

9. The system of claim 8 wherein each of the at least one flux layers are magnetically permeable.

10. The system of claim 7 wherein each of the at least one flux layers are magnetically permeable.

11. The system of claim 1 wherein said at least one first electric coil is mounted on the first rotor in a moving coil configuration and magnetically coupled with the second rotor and wherein said magnets are magnetically permeable material in a reluctance motor configuration.

12. The system of claim 1 wherein said at least one first electric coil is mounted on the second rotor in a moving magnets configuration and magnetically coupled with first rotor and wherein said magnets are magnetically permeable material in a reluctance motor configuration.

13. The system of claim 1 wherein said first rotor is capable of resonating with reference to the second rotor while the first electric coil is energized by an alternating electric current.

14. The system of claim 1 wherein said at least one second electric coil is mounted on the second rotor in a moving coil configuration and magnetically coupled with the stator and wherein the first and second magnets are magnetically permeable material in a reluctance motor configuration.

15. The system of claim 1 wherein said at least one second electric coil is mounted on the stator in a moving magnets configuration and magnetically coupled with the second rotor.

16. The system of claim 1 wherein said second rotor is capable of resonating with reference to the stator while the second electric coil is energized by an alternating electric current.

17. The system of claim 1 wherein said first pair of torsion springs and second pair of torsion springs can be separate mechanical parts or an integrated single mechanical piece made of metal from the group consisting of: titanium, titanium alloy, stainless steel, Inconel, steel and steel alloy.

18. The system of claim 1 which is used in at least one of the group consisting of: an automobile LIDAR system, a vehicle autonomous drive, a robot, a factory automation LIDAR, a projector, and a heads up display.

19. The system of claim 1:
wherein said first rotor comprises at least one torsion spring, at least one insert, at least one spacer, and at least one flux layer wherein said at least one insert, at least one spacer, and at least flux layer are integrated;
wherein said second rotor comprises at least one torsion spring, at least one insert, at least one spacer, and at least one flux layer wherein said at least one insert, at least one spacer, and at least one flux layer are integrated; and
the stator comprises at least one insert, at least one spacer, and at least one flux layer and wherein the at least one insert, at least one spacer and at least one flux layer are integrated.

20. A method of LIDAR scanning to determine the configuration of a distant object utilizing a dual axis flexure beam steering mirror (BSM) assembly system comprising:
at least one rangefinder unit transmitting light onto the beam steering mirror (BSM) assembly having a beam steering mirror mounted on a first rotor in a first position of a plurality of positions, a first pair of torsion springs forming a first axis upon which the first rotor rotates together with the beam steering mirror, a second pair of torsion springs forming a second axis upon which the first rotor, second rotor and the beam steering mirror rotate, a stator providing a stationary platform for the first and second rotors, and a first electric coil and a second electric coil providing a force to cause the BSM to rotate; and
moving the beam steering mirror from the first position of the plurality of positions to a second position of the plurality of positions, wherein the plurality of positions are in a range of approximately −20 to +20 degrees on the first axis to a range of approximately −20 to +20 degrees on the second axis.

21. The method of claim 20, wherein the first axis is aligned with the first torsion springs and the second axis is aligned with the second torsion springs; and
the BSM assembly steers time dependent, sequentially transmitted laser light from the at least one rangefinder unit and converts distance measuring data of the distant object into a three dimensional scanned data cloud.

22. A Light Imaging, Detection and Ranging (LIDAR) system comprising:
- at least one LIDAR unit;
- a beam steering mirror (BSM) assembly having a beam steering mirror mounted on a first rotor with approximately plus or minus 20 degrees of mechanical rotational freedom, a first pair of torsion springs forming a first axis upon which the first rotor rotates together with the beam steering mirror, a second pair of torsion springs forming a second axis with approximately plus or minus 20 degrees of mechanical rotational freedom, upon which the first rotor, second rotor and the beam steering mirror rotate with a stator providing a stationary platform for the first and second rotors, and a first electric coil and a second electric coil providing a force to cause the BSM to rotate;
- wherein the BSM assembly is capable of transmitting light from the at least one LIDAR unit on the beam steering mirror having dimensions in a first axis of greater than approximately 10 millimeters (mm) and a second axis of greater than approximately 10 mm; and
- wherein the beam stirring mirror is configured to resonate from an electromagnetic force on the first axis and the second axis to achieve in range of approximately negative 20 degrees to plus 20 degrees optical field of view on both the first axis and the second axis.

* * * * *